United States Patent
Hainsworth et al.

(10) Patent No.: US 10,266,269 B2
(45) Date of Patent: Apr. 23, 2019

(54) INERTIA REEL MOUNTS AND MOUNTING ARRANGEMENTS

(71) Applicant: Sikorsky Aircraft Corporation, Stratford, CT (US)

(72) Inventors: Barton J. Hainsworth, Oxford, CT (US); Walter Thomas Mayo, IV, Norwalk, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 54 days.

(21) Appl. No.: 15/605,381

(22) Filed: May 25, 2017

(65) Prior Publication Data

US 2018/0339776 A1    Nov. 29, 2018

(51) Int. Cl.
| | |
|---|---|
| *B64D 11/06* | (2006.01) |
| *B60R 22/34* | (2006.01) |
| *B60R 22/195* | (2006.01) |
| *B60R 22/28* | (2006.01) |

(52) U.S. Cl.
CPC ........ *B64D 11/062* (2014.12); *B60R 22/1951* (2013.01); *B60R 22/3413* (2013.01); *B60R 2022/286* (2013.01)

(58) Field of Classification Search
CPC .. B64D 11/062; B64D 11/0619; B60N 2/265; B60N 2/42; B60N 2/4221; B60N 2/4228; B60N 2/688; B60R 22/26; B60R 22/28; B60R 22/30; B60R 22/1951; B60R 22/34; B60R 22/341; B60R 22/3413; B60R 2022/286

USPC ....... 297/470, 471, 472, 473, 476, 478, 479, 297/480
See application file for complete search history.

(56) References Cited

U.S. PATENT DOCUMENTS

| | | | | |
|---|---|---|---|---|
| 5,544,918 | A * | 8/1996 | Fleming | B60R 21/015 188/377 |
| 5,678,782 | A | 10/1997 | Osumi | |
| 6,145,881 | A * | 11/2000 | Miller, III | B60R 22/1951 280/801.2 |
| 6,336,664 | B1* | 1/2002 | Roder | B60R 22/1958 280/806 |
| 7,469,928 | B2* | 12/2008 | Clute | B60R 22/46 280/801.2 |
| 8,807,658 | B2* | 8/2014 | Ott | B60R 22/26 297/483 |
| 9,168,890 | B1* | 10/2015 | Jaradi | B60R 22/36 |
| 9,809,193 | B2* | 11/2017 | Marriott | B60R 22/203 |
| 2003/0029661 | A1* | 2/2003 | Motozawa | B60R 22/1955 180/274 |

(Continued)

FOREIGN PATENT DOCUMENTS

| | | | | | |
|---|---|---|---|---|---|
| JP | 2001063521 | A | * | 3/2001 | ........ B60R 22/1958 |
| WO | WO-0126937 | A1 | * | 4/2001 | ............ B60N 2/508 |

*Primary Examiner* — Ryan D Kwiecinski
(74) *Attorney, Agent, or Firm* — Cantor Colburn LLP

(57) ABSTRACT

An inertia reel mount for a seat includes a slide, a carriage arranged to support a seatbelt inertia reel, and a damper. The carriage is movable between first and second positions relative to the slide. The damper is fixed to the slide, is arranged between the carriage and the slide to oppose movement of the carriage, and is arranged to absorb kinetic energy from the carriage from sudden acceleration of a seat occupant secured in the seat by the seatbelt as the carriage moves from the first position to the second position.

19 Claims, 3 Drawing Sheets

(56) References Cited

U.S. PATENT DOCUMENTS

| | | | |
|---|---|---|---|
| 2010/0219667 A1* | 9/2010 | Merrill | B60N 2/24 297/216.17 |
| 2013/0009391 A1* | 1/2013 | Miller | B60R 22/46 280/806 |
| 2014/0167459 A1* | 6/2014 | Merrill | B60N 2/24 297/216.16 |

* cited by examiner

INERTIA REEL MOUNTS AND MOUNTING ARRANGEMENTS

BACKGROUND OF THE INVENTION

Field of the Invention

The present disclosure relates to seat assemblies for vehicles, and in particular to inertia reel mounts and mounting arrangements for seat assemblies in vehicles.

Description of Related Art

Vehicles, such as aircraft, commonly have seating for passengers and crew. The seating generally include safety features designed to protect an occupant from injury in the event of sudden acceleration. Vehicle occupants can experience sudden acceleration, for example, during automobile crashes and in aircraft during takeoffs and landings. To prevent occupant injury from such accelerations vehicles typically employ seating restraints, which apply reaction forces to retain occupants in the vehicle seating in the event of a sudden acceleration. Preventable injury mechanisms include both occupant acceleration, i.e. the intensity and duration of accelerations experienced by occupants, and occupant impact hazards, i.e. articles in the immediate vicinity of an occupant that may cause contact injuries.

Straps generally connect the occupant restraints to surrounding structure and transfer forces thereto commensurate with the reaction force applied to the occupant. As the straps transfer the force into the surrounding structure the strap loads in tension, tensile stress developing in the strap. When the associated tensile stress is below the tensile strength of the strap material and strap connections, the restraint typically retains the occupant in the seat. However, if the tensile stress exerted on the straps during the sudden acceleration exceeds the tensile strength the strap material and/or strap connections, the strap can part, causing the restraint to allow the occupant to flail and/or be ejected from the seat by the sudden acceleration. In addition, high tensile stressed straps can also impart external and/or internal injuries on an occupant.

Such conventional methods and systems have generally been considered satisfactory for their intended purpose. However, there is still a need in the art for improved inertia reel mounts, inertia reel mount arrangements, and seat assemblies employing such mounts and mount arrangements. The present disclosure provides a solution for this need.

SUMMARY OF THE INVENTION

An inertia reel mount for a seat includes a slide, a carriage arranged to support a seatbelt inertia reel, and a damper. The carriage is movable between first and second positions relative to the slide. The damper is fixed to the slide, is arranged between the carriage and the slide to oppose movement of the carriage, and is configured to absorb kinetic energy from the carriage from sudden acceleration of a seat occupant secured in the seat by the seatbelt as the carriage moves from the first position to the second position.

In certain embodiments, the seat can be a vehicle seat. The seat can be a ground vehicle or aircraft seat. The slide can be fixed to a seat. The slide can have a stop. The stop can be on an end of the slide. The carriage second position can be between the stop and the carriage first position. The damper can be arranged along the slide. The damper can be arranged between the stop and the carriage first position. The slide can have a T-slot. The T-slot can extend along at least a portion of the length of the slide. The carriage can be slidably disposed within the T-slot.

In accordance with certain embodiments, the carriage can have a fastener pattern. The fastener pattern can conform to a fastener pattern for an MA-16, an MA-16A inertia reel or other automatic-locking inertia reel. An inertia reel, such as an MA-16 inertia reel or an MA-16A inertia reel can be fixed relative to the carriage. A seatbelt can be connected to the inertia reel. The seatbelt can have first and second ends. The first end of the seatbelt can be connected to the seat. The second end of the seatbelt can be connected to the inertia reel. The inertia reel can be mounted to a seatback of the seat. The seatbelt can be routed behind the seatback.

It is also contemplated that, in accordance with certain embodiments, the damper can include a resilient member. The damper can have a first end and a second end. The damper first end can abut the stop. The damper second end can abut the carriage. The carriage can have a crush face. The crush face can abut the damper. The damper can be arranged between the carriage crush face and the stop. The damper can include a sacrificial member. The sacrificial member can include a composite body. The sacrificial member can include a honeycomb body. The seatbelt can have a tensile strength. The damper can have a compressive strength. The compressive strength of the damper can be less than the tensile strength of the seatbelt. The seat assembly can have a yield strength. The yield strength of the seat assembly can be greater than the tensile strength of the seatbelt and or the damper.

A seat assembly for a vehicle includes a seat, an inertia reel mount as described above with the slide fixed relative to the seat, an inertia reel, and seatbelt. The inertia reel is fixed relative to the carriage. The seatbelt has a first end connected to the seat, an opposed second end connected to the inertia reel, and a tensile strength. The tensile strength of the seatbelt is greater than a compressive strength of the damper such movement of the carriage from the first position crushes the damper to reduce tensile loads exerted on the seatbelt from sudden acceleration of a seat occupant.

An inertia reel mounting arrangement includes a slide configured for fixation relative to a vehicle seat along a seatbelt load path, a carriage, and a damper. The carriage is slidably mounted to the slide, is movable between first and second positions along the seatbelt load path relative to the slide, and is configured to support seatbelt inertia reel. The damper is fixed to the slide along the seatbelt load path between the carriage first position and the carriage second position.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
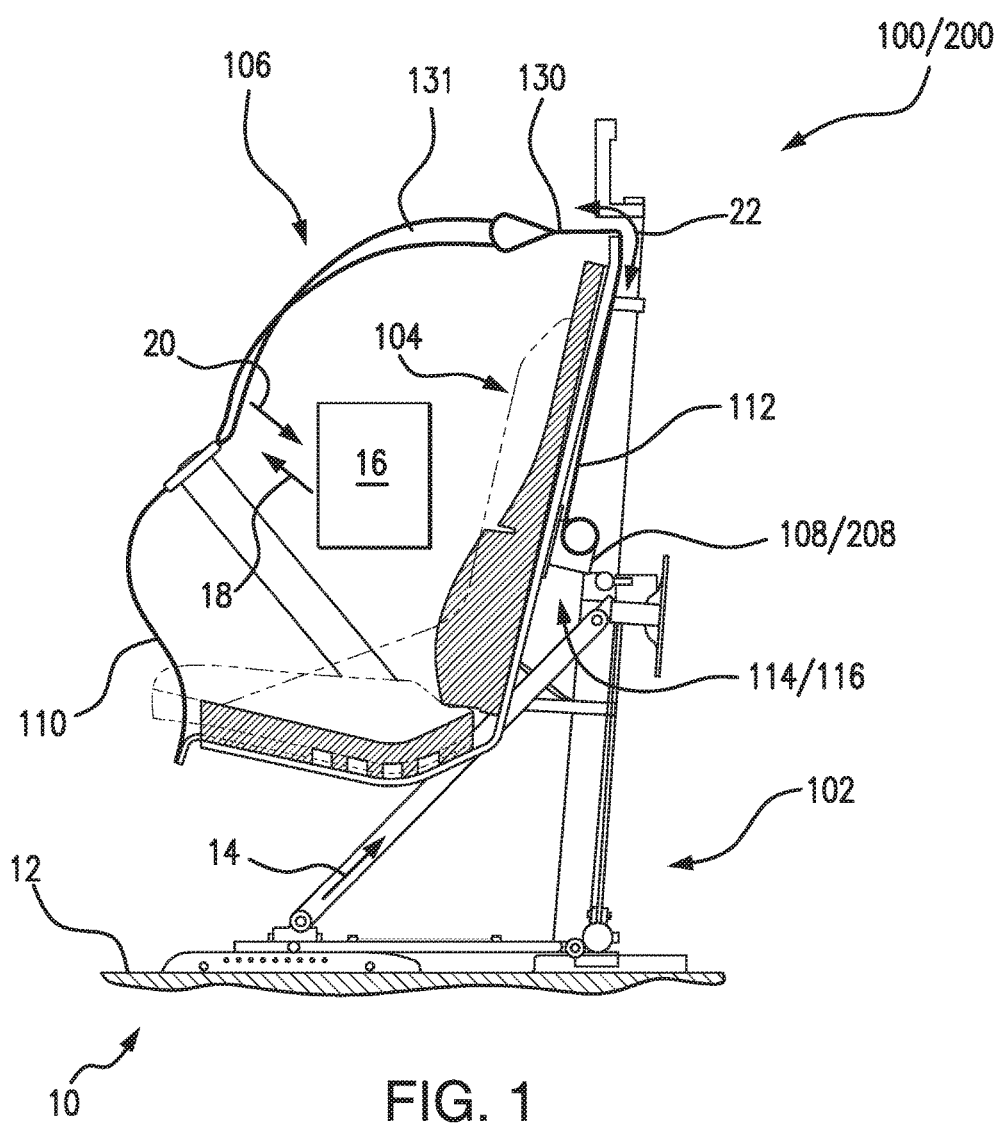
FIG. 1 is a side view of an exemplary embodiment of a seat assembly constructed in accordance with the present disclosure, showing an inertia reel arrangement with an inertia reel mount movably coupling an inertia reel to the seat assembly.

Reference will now be made to the drawings wherein like reference numerals identify similar structural features or aspects of the subject disclosure. For purposes of explanation and illustration, and not limitation, a partial view of an exemplary embodiment of a seat assembly with an inertia reel mount in accordance with the disclosure is shown in FIG. 1 and is designated generally by reference character 100. Other embodiments of seat assemblies, inertia reel mounts for seat assemblies, and inertia reel mounting arrangements in accordance with the disclosure, or aspects thereof, are provided in FIGS. 2-4, as will be described. The systems and methods described herein can be used in vehicles to restrain passengers and crew in seat assembles during sudden acceleration, such as in rotorcraft during takeoff and landing, though the present disclosure is not limited to rotorcraft or to aircraft in general.

Referring to FIG. 1, an aircraft 10 is shown. Aircraft 10 includes airframe structure 12 and seat assembly 100. Seat assembly 100 is supported by airframe structure 12 and includes a frame 102, a bucket 104, a seatbelt 106, and an inertia reel 108. Frame 102 is connected to airframe structure 12 and has a stiffness or rigidity, i.e. yield strength 24. Bucket 104 is connected to frame 102 and is configured to support seat occupant 16. Inertia reel 108 is coupled to frame 102 by an inertia reel mount 114 through an inertia reel mounting arrangement 116. Seatbelt 106 is connected between frame 102 and inertia reel 108, and includes a harness 131 retaining seat occupant 16, a first end 110 fixed to frame 102, and second end 112 movably fixed to frame 102 by inertia reel mount 114 and inertia reel 108.

In the illustrated exemplary embodiment inertia reel mount 114 and inertia reel mounting arrangement 116 couple inertia reel 108 to the seatback of seat assembly 100. This is for illustration for purposes only and is non-limiting. It is to be understood and appreciated that inertia reel mount 114 and inertia reel mounting arrangement 116 can be configured to couple inertia reel 108 to any other suitable portion of seat assembly 100 and/or to airframe structure 12, as suitable for an intended application. In the illustrated exemplary embodiment seat assembly 100 is a pilot or door gunner seat for rotorcraft. This is also for illustration purposes only and is non-limiting as embodiments of seat assemblies disclosed herein can be used in other types of vehicles. For example, it is contemplated that a ground vehicle seat assembly 200, e.g., for a passenger vehicle, having an inertia lock 208 can employ inertia reel mount 114.

As will be appreciated by those of skill in the art, vehicle occupants are commonly subject to various accelerations due vehicle movement. Some of the accelerations may be sufficient to cause the occupant to flail in the seat or be ejected, potentially injuring the occupant. For that reason seat assembly 100 includes seatbelt 106. Seatbelt 106 exerts a reaction force 20 on seat occupant 16 in opposition to sudden acceleration 18, preventing seat occupant 16 to flail or be ejected from seat assembly 100 due to acceleration 18.

Reaction force 20 loads seatbelt 106 in tension, generating tensile stress 22 in seatbelt 106. Tensile stress 22 is a function at least in part of the ability of the opposed ends to pull against a harness 131 of seatbelt 106 restraining seat occupant 16. In this respect harness 131 connects to frame 102 through a seatbelt first end 110, which is rigidly fixed to frame 102, and a seatbelt second end 112, which is selectively fixed to frame 102 by inertia reel 108 and inertia reel mount 114. Inertia reel 108 allows movement of seatbelt second end 112 when acceleration 18 is below a first acceleration A and fixes seatbelt second end 112 relative to inertia reel 108 when acceleration 18 is above first acceleration A. Acceleration 18 may be sensed at seatbelt second end 112, proximate to inertia reel 108, with a sensing device 113 (shown in FIG. 2) arranged to sense strap acceleration and/or omnidirectional forces at the interface of second end 112 and inertia reel 108. This prevents elongation of seatbelt 106 from delaying response of inertia reel 108 to acceleration 18.

Inertia reel mount 114 fixes inertia reel 108 relative to frame 102 when acceleration 18 is below a second acceleration B, and allows inertia reel 108 to move (i.e. stroke) relative to frame 102 when acceleration 18 is above second acceleration B. Applicants have come to appreciate that the limited movement afforded by the stroke provided by inertia reel mount 114 can relieve tensile stress 22 during sudden accelerations of significant magnitude (e.g., shocks), damping the sudden acceleration and preventing seatbelt 106 from parting. Additionally, inertia reel 108 movement can relieve reaction force 20 exerted on seat occupant 16. In certain embodiments, the damping provided by inertia reel mount 114 to seatbelt 106 allows seat assembly 100 to be relatively rigid, i.e., have a yield strength A that is greater than a tensile strength B of seatbelt 106.

Figure 2:
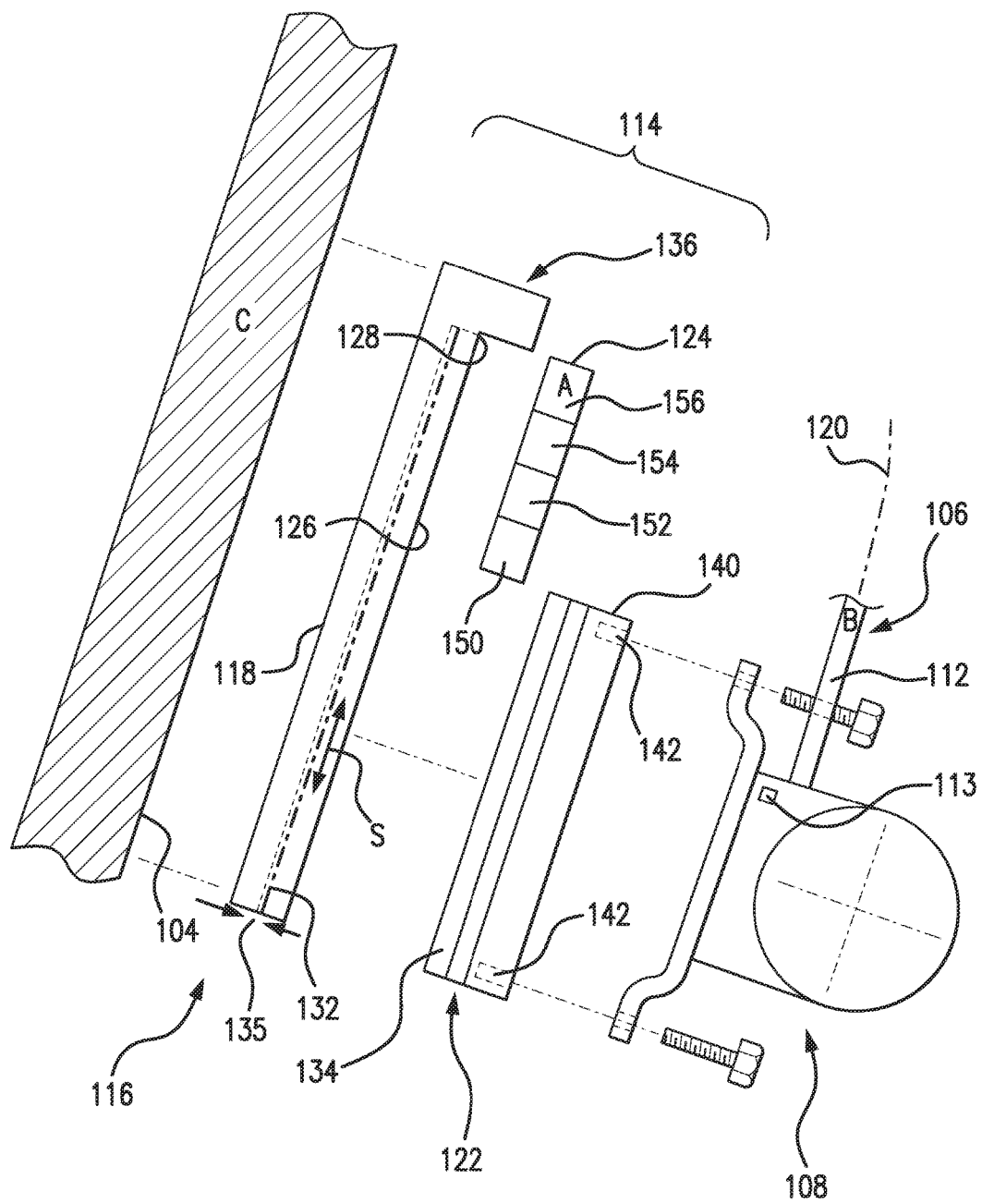
FIG. 2 is an exploded view of the inertia reel arrangement of FIG. 1, schematically showing a slide and damper exploded away from a slide of the inertia reel mount.

With reference to FIG. 2, inertia reel mounting arrangement 116 is shown. Inertia reel mounting arrangement 116 includes inertia reel 108 and inertia reel mount 114. Inertia reel mount 114 includes a slide 118, a carriage 122, and a damper 124. Inertia reel 108 connects to frame 102 through inertia reel mount 114 with one or more fasteners. Carriage 122 is slidably coupled to slide 118 and is arranged to move relative to slide 118 according to force applied to carriage 122 by seatbelt 106. Slide 118 is fixedly connected to frame 102, and inertia reel 108 is connected to frame 102 through carriage 122 and slide 118.

Inertia reel 108 receives second end 112 of seatbelt 106. Second end 112 is fixed to a rotatable bobbin (not shown for purposes of clarity) selectively permitted to rotate. In this respect the bobbin rotates when acceleration is below the predetermined value, thereby shortening (i.e. taking up slack) or lengthening (i.e. paying out slack) seatbelt 106. As will be appreciated by those of skill in the art, shortening/lengthening seatbelt 106 enables seat occupant 16 (shown in FIG. 1) to mount and dismount from bucket 104 and/or adjust the length of seatbelt 106 for fit and comfort. When the acceleration is above the above the predetermined value inertia reel 108 auto-locks. Auto-locking causes inertia reel 108 to cease paying-out/taking-up slack to/from seatbelt 106, inertia reel thereby restraining seat occupant 16 in bucket 104 (shown in FIG. 1) and preventing occupant flailing in bucket 104 and/or ejection from bucket 104 due to the acceleration. In certain embodiments, inertia reel 108 is an MA-16 or MA-16A inertia reel, available from Cobham Mission Systems of Davenport, Iowa.

Slide 118 has a keyway 132 and a stop 136. Keyway 132 is defined within an interior of slide 118 and is open on a side facing carriage 122 for receiving carriage 122. Stop 136 is arranged along a longitudinal end of slide 118 and extends at an angle from keyway 132, which is illustrated in an exemplary way as a 90-degree angle. A carriage first position 126 and carriage second position 128 are disposed along a longitudinal length of slide 118 and are longitudinally spaced apart from one another. Carriage first position 126 is arranged on a side of carriage second position 128 opposite stop 136. In certain embodiments, keyway 132 is a T-slot arranged to provide sufficient frictional engagement between slide 118 and carriage 122 to define force necessary for seatbelt 106 to apply to carriage 122 in order to move the carriage from carriage first position 126 and carriage second position 128.

Carriage 122 has a key 134, a crush face 140, and a fastener pattern 142. Key 134 is substantially conjugate to keyway 132 and is slidably received within keyway 132 such that crush face 140 opposes stop 136. Crush face 140 opposes stop 136 and is spaced apart from stop 136 by damper 124. Fastener pattern 142 is arranged on side of carriage 122 opposite key 134 and is arranged to receive fasteners for fixing inertia reel 108 to carriage 122. Fastener pattern 142 fixes inertial reel 108 to carriage 122. Fasteners are received in carriage 122 according to the selection of fastener pattern 142. In certain embodiments fastener pattern 142 conforms to an MA-16 or an MA-16A fastener pattern. This allows inertia reel mount 114 to receive an MA-16 or MA-16A inertia reel mounted on seat assembly with a legacy mounting arrangement.

In certain embodiments a gap 135 (illustrated with a dashed-dotted line in FIG. 2) is defined between a surface of key 134 and opposing surface of keyway 132 to facilitate debris shedding from inertia reel mount 114. In accordance with certain embodiments key 134 can be T-shaped, enabling a tight (e.g., interference) fit between carriage 122 and slide 118. It is also contemplated that carriage 122 can be loosely received within slide 118, allowing the force necessary to move carriage 122 from carriage first position 126 to carriage second position 128 to be determined by the arrangement of damper 124.

Damper 124 is connected to slide 118 between slide 118 and carriage 122. Damper 124 has longitudinally opposed first and second ends. The first end of damper 124 abuts carriage 122. The second end of damper 124 abuts stop 136. Carriage first position 126 and carriage second position 128 are disposed along the longitudinal length of damper 124 such that movement of carriage 122 from carriage first position 126 to carriage second position 128 compresses (or ejects) damper 124 from a space defined between crush face 140 and stop 136. Damper 124 has a compressive strength A, which is smaller than tensile strength B of seatbelt 106.

In certain embodiments damper 124 can include a resilient member 150. Resilient member 150 can be, for example, a compression spring. The first and second ends of resilient member 150 connect to carriage 122 and slide 118, respectively. It is contemplated that resilient member 150 can have a spring coefficient suitable for allowing movement of carriage 122 relative to slide 118 when acceleration is above the predetermined value through the associated force e.g., force T (shown in FIG. 1), communicated through seatbelt 106 and carriage 122.

In accordance with certain embodiments, damper 124 can include a sacrificial member 152, for example a tube flaring arrangement or folding tube arrangement. First and second ends of sacrificial member 152 can be connected to carriage 122 and slide 118. It is contemplated that sacrificial member 152 can have a crush coefficient suitable for allowing movement of carriage 122 relative to slide 118 when acceleration is above the predetermined value through the associated force, e.g., force T (shown in FIG. 1), communicated through seatbelt 106 and carriage 122. The crush coefficient can be defined, for example, by a metallic or composite body 154 included in damper 124. The crush coefficient can be defined, for example, by a honeycomb body 156 included damper 124.

Figure 3:
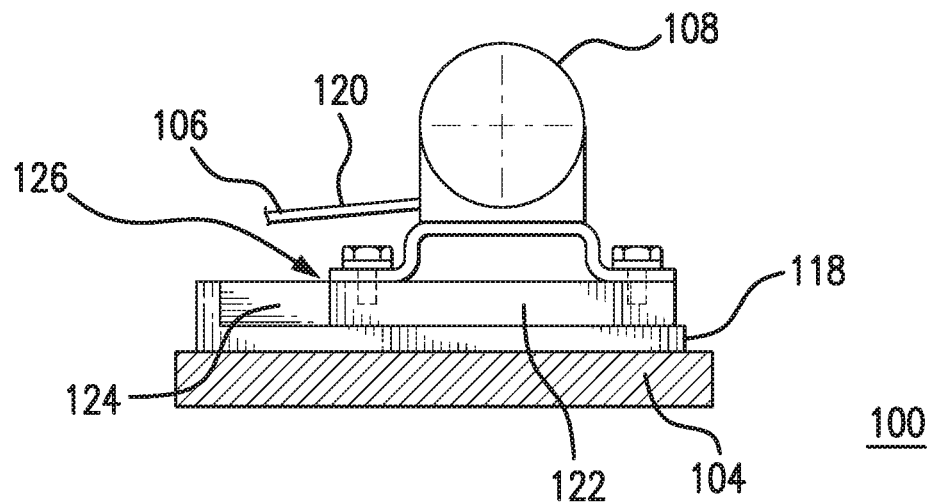
FIG. 3 is a schematic view of the seat assembly of FIG. 1, showing the damper of the inertia reel mount in an uncompressed condition.
Figure 4:
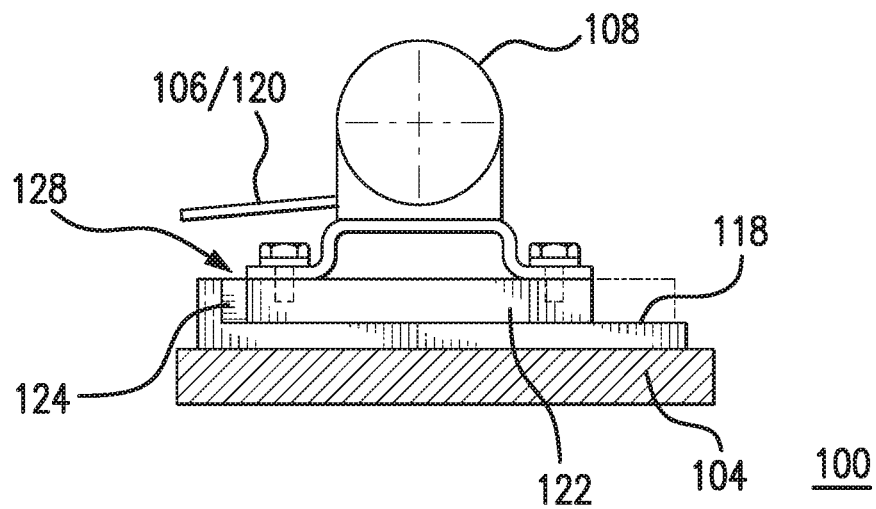
FIG. 4 is a schematic view of the seat assembly of FIG. 1, showing the damper of the inertia reel mount in a compressed condition to reduce tensile stress in the seatbelt from sudden acceleration of an occupant of the seat assembly.

With reference to FIGS. 3 and 4, movement of carriage 122 from carriage first position 126 to carriage second position 128 is shown. Referring to FIG. 3, carriage 122 is shown in carriage first position 126. In carriage first position 126 damper 124 is uncompressed and longitudinally overlaps carriage second position 128. Carriage 122 remains in carriage first position 126 when force exerted on inertia reel 108 is below the crush force necessary to compress damper 124.

Referring to FIG. 4, carriage 122 is shown in carriage second position 128. When the force exerted on inertia reel 108 exceeds the crush force necessary to compress damper 124 carriage 122 moves from carriage first position 126 to carriage second position 128. In embodiments where damper 124 includes resilient member 150 a force corresponding to the spring coefficient of resilient member 150 develops in opposition to movement of carriage 122. In embodiments where damper 124 includes sacrificial member 152 damper 124 collapses in response to the crush force, the opposition force posed by damper 124 dropping as damper 124 collapses longitudinally. As will be appreciated by those of skill in the art in view of the present disclosure, compression/collapse of damper 124 reduces the load exerted on seatbelt 106, reducing tensile stress carried by seatbelt 106 and thereby reducing via a damping effect the likelihood that peak stress from the shock of sudden acceleration 18 will cause seatbelt 106 to excessively stretch or part.

Some rotorcrafts include crashworthy seats equipped with inertia reels. The inertia reel is generally fixed relative to the seat and couples to an occupant harness by a lead-in strap. The inertia reels typically have an auto-lock mechanism, which engages when sudden accelerations or omnidirectional impact forces is sensed to secure occupant. In some circumstances engagement of the auto-lock mechanism in response to sudden accelerations can exert extremely high tensile loads on the seat belt. In some seat assemblies, such as those that are stiff, the shock of the tensile stress exerted by the seatbelt load from sudden acceleration can cause the strap to stretch or part.

In embodiments described herein an energy absorbing structure is employed to reduce loading. In certain embodiments, an inertia reel arrangement includes a high-force, short-stroke, dynamic energy damper. The damper is arranged to reduce shoulder strap loads by absorbing shock energy over a stroke of the damper. In accordance with certain embodiments the inertia reel arrangement includes a slide arranged to be fixed relative to seat and carriage coupled to the slide. The carriage is movable relative to the slide between first and second positions along the strap load path and is arranged to mount an inertial reel. The damper is arranged between the carriage and the slide and to be compressed between the carriage and slide according to a load communicated along the load path by the seatbelt. The slide can be a T-slot slide, the inertia reel can be an MA-16A inertia reel, and the damper can include a compressible or extendable member. Examples of compressible members include springs, compressible composite or metallic members, flaring tube arrangements, and folding tubes arrangements by way of non-limiting example. Examples of extendable members include extension springs, strap/wire benders, and inversion tubes by way of non-limiting example.

The methods and systems of the present disclosure, as described above and shown in the drawings, provide for vehicular restraint systems with superior properties including reduced inertia reel loading to shock loads that would otherwise exceed the shock rating to the inertia reel, thereby allowing use of relatively stiff occupant seat structures. This can prevent shoulder restraint failure while controlling occupant flail during a vehicle impact. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. An inertia reel mount for a seat assembly, comprising:
   a slide;
   a carriage coupled to the slide and movable between first and second positions relative to the slide, the carriage configured to support a seatbelt inertia reel;
   an inertia wheel mounted to a frame, the frame being detachably mounted to the carriage through one or more mechanical fasteners; and
   a damper fixed to the slide between the carriage first position and the carriage second position,
   wherein the damper is arranged to oppose movement of the carriage from the first position to reduce tensile stress in a seatbelt coupled to the carriage from sudden acceleration of a seat occupant secured in the seat assembly by the seatbelt.

2. The inertia reel mount as recited in claim 1, wherein the slide has a T-slot extending along at least a portion of its length, the carriage being slidably disposed in the T-slot.

3. The inertia reel mount as recited in claim 1, wherein the slide has a stop arranged on a side of the carriage second position opposite the carriage first position.

4. The inertia reel mount as recited in claim 3, wherein the damper is arranged along the slide between the stop and the carriage first position.

5. The inertia reel mount as recited in claim 3, wherein the carriage has a crush face, the damper being arranged between the slide stop and the carriage crush face.

6. The inertia reel mount as recited in claim 1, further comprising a vehicle seat, wherein the slide is fixed to the vehicle seat.

7. The inertia reel mount as recited in claim 1, wherein the damper includes a resilient member with opposed ends connected between the carriage and the slide.

8. The inertia reel mount as recited in claim 1, wherein the damper includes a sacrificial element having first and second ends, wherein the first end abuts the slide, wherein the second end abuts the carriage.

9. The inertia reel mount as recited in claim 8, wherein the carriage second position is arranged along a length of the damper.

10. The inertia reel mount as recited in claim 8, wherein the sacrificial element includes a composite body.

11. The inertia reel mount as recited in claim 8, wherein the sacrificial element includes a honeycomb body.

12. The inertia reel mount as recited in claim 1, wherein the one or more mechanical fasteners define a fastener pattern conforming to an MA-16A inertia reel.

13. The inertia reel mount as recited in claim 1, further comprising a seatbelt arranged along the seatbelt load path and having an end fixed relative to the inertia reel.

14. The inertia reel mount as recited in claim 13, further comprising a vehicle seat with a yield strength, wherein the slide is fixed relative to the occupant seat, wherein the seat has a yield strength that is greater than a tensile strength of the seatbelt.

15. The inertia reel mount as recited in claim 1, wherein the damper is formed from a plurality of components including at least two of a resilient member, a composite body, a sacrificial member, and a honeycomb body.

16. A seat assembly for a vehicle, comprising:
   a seat;
   an inertia reel mount as recited in claim 1, wherein the slide is fixed relative to the seat; and
   a seatbelt with opposed first and second ends, wherein the seatbelt first end is connected to the inertia reel and the seatbelt second end is connected to the seat, wherein the damper has a compressive strength that is less than a tensile strength of the seatbelt.

17. The seat assembly as recited in claim 16, wherein the damper includes a sacrificial element with opposed ends connected between the carriage and the slide, the damper connected between the carriage first and second positions, and the sacrificial element including a composite honeycomb structure.

18. An inertia reel mounting arrangement, comprising:
   a slide configured for fixation relative to a vehicle seat along a seatbelt load path;
   a carriage slidably mounted to the slide and movable between first and second positions along the seatbelt load path relative to the slide, wherein the carriage is configured to support a seatbelt inertia reel;
   an inertia wheel fixedly mounted to a frame, the frame being detachably mounted to the carriage through one or more mechanical fasteners; and
   a damper fixed to the slide along the seatbelt load path between the carriage first position and the carriage second position.

19. An inertia reel mounting arrangement according to claim 18, wherein the damper is formed from a plurality of components including at least two of a resilient member, a composite body, a sacrificial member, and a honeycomb body.

* * * * *